(12) United States Patent
Kodama et al.

(10) Patent No.: US 7,722,240 B2
(45) Date of Patent: May 25, 2010

(54) SURFACE LIGHT SOURCE DEVICE AND TRANSMISSION DISPLAY DEVICE

(75) Inventors: Daijiro Kodama, Mihara (JP);
Masahiro Goto, Mihara (JP); Wataru Tokuhara, Higashihiroshima (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 157 days.

(21) Appl. No.: 11/848,456

(22) Filed: Aug. 31, 2007

(65) Prior Publication Data
US 2008/0074870 A1  Mar. 27, 2008

(30) Foreign Application Priority Data
Sep. 1, 2006  (JP)  ............................. 2006-238351

(51) Int. Cl.
*F21V 7/04* (2006.01)
(52) U.S. Cl. .................. 362/619; 362/217.05; 362/614
(58) Field of Classification Search ............ 362/217.05, 362/612, 614–619
See application file for complete search history.

(56) References Cited
U.S. PATENT DOCUMENTS
7,220,036 B2 * 5/2007 Yi et al. ...................... 362/561
7,510,308 B2 * 3/2009 Goto .......................... 362/330

FOREIGN PATENT DOCUMENTS
JP  2006-120584  5/2006

* cited by examiner

*Primary Examiner*—John A Ward
(74) *Attorney, Agent, or Firm*—Burr & Brown

(57) ABSTRACT

A surface light source device and a transmission display device are provided. A surface light source device includes a light source portion, a light controlling sheet located on the output light side of the light source portion, and a light diffusing sheet located on the output light side of the light controlling sheet and including micro-convex structures. The light diffusing sheet includes a transparent base film, and a light diffusing layer coated on a surface of the transparent base film. Micro-beads incorporated in the light diffusion sheet exhibit a lens effect and provide a light condensing effect and a light diffusing effect. As such, the output light properties of the surface light source device can be adjusted to be smoother, thereby providing higher front luminance and avoiding occurrence of moiré.

10 Claims, 13 Drawing Sheets

SURFACE LIGHT SOURCE DEVICE AND TRANSMISSION DISPLAY DEVICE

CROSS REFERENCE TO RELATED APPLICATIONS

This application is based upon the prior Japanese Patent Application No. 2006-238351 filed on Sep. 1, 2006, the entire contents of which are incorporated herein by reference.

BACKGROUND OF THE INVENTION

1. Field of the Invention

The present invention relates to a surface light source device for illuminating a liquid crystal display device or the like, and also relates to a transmission display device including the same.

2. Background Art

Various types of surface light source devices have been proposed and put to practical use, as surface light sources for illuminating transmission liquid crystal displays or the like from the back side. The surface light source devices are, primarily, classified into a type of converting a usual light source to a surface light source, and into an edge light type and a direct type.

For example, the direct type light source is configured to introduce light into a display device through the back side, by utilizing parallel cold-cathode tubes. In this case, the parallel cold-cathode tubes are spaced a suitable distance from a transmission display portion of an LCD panel or the like. Additionally, between those elements, a plurality of optical element sheets, each having a light diffusing effect and/or light converging effect, are combined.

As the optical element sheets used in the surface light source devices, there are optical sheets, in each of which a plurality of optical structures, such as lenses or prisms, are formed for the purpose of controlling the viewing angle (or output angle of light), or light diffusing sheets each configured for diffusing light.

When using such optical element sheets, however, due to the plurality of optical structures arranged regularly, moiré is likely to occur in each pitch of pixels (or picture elements) included in an LCD panel or the like.

Patent Document 1 discloses one example utilizing prism sheets and light diffusing sheets, in combination, for the surface light source device. As used herein, the prism sheet, while being not clearly defined in the Patent Document 1, is often used as an optical sheet for use in the surface light source device, and refers to products called luminance enhancing films or the like, each configured by arranging multiple unit optical structures (or unit prism structures), each having a cross section shaped as a generally isosceles right-angled triangle.

However, in the surface light source device utilizing the prism sheets as described above, while higher front luminance can be provided, the viewing angle properties tend to be drastically changed, as such the brightness and/or darkness is likely to be changed abruptly due to shifts of visual points.

In addition, the Patent Document 1 teaches only the combination of the optical sheets and light diffusing sheets, and does not refer to any way of combining the optical sheets and diffusing sheets of particular properties.

Patent Document 1: TOKUKAI No. 2006-120584, KOHO

SUMMARY OF THE INVENTION

An object of the present invention is to provide a surface light source device and a transmission display device, which can exhibit smoother change of output light properties and higher front luminance, and avoid occurrence of moiré.

The present invention has achieved the above object by taking a solution as will be described below. It should be appreciated that, in order to facilitate understanding, while several examples of this invention will be described with reference numerals being assigned to respective components, this invention is not limited to these aspects.

The present invention is a surface light source device for illuminating a transmission display portion from the back side, the surface light source device comprising: a light source portion having an output light face for outputting substantially perfectly diffused light; a light controlling sheet provided on the output light side relative to the light source portion and including unit optical structures each adapted to condense and/or diffuse light outputted from the light source portion; and a light diffusing sheet provided on the output light side relative to the light controlling sheet and including micro-convex structures formed on the output light side.

The present invention is the surface light source device described above, wherein the light source portion includes: a light emitting portion for emitting light; and a perfect diffusing sheet, which is adapted to provide substantially perfect diffusion of light emitted from the light emitting portion and constitutes the output light face.

The present invention is the surface light source device described above, wherein the light diffusing sheet includes: a base layer; and a light diffusing layer provided on the base layer, wherein the diffusing layer includes multiple micro-beads and a binder for binding the micro-beads, and wherein portions in which the micro-beads are fixed project toward the output light side relative to portions in which the micro-beads are not fixed and only the binder is included, thereby forming the micro-convex structures.

The present invention is the surface light source device described above, wherein the haze value of the light diffusing sheet is 70% or higher.

The present invention is the surface light source device described above, wherein when aV is a half-maximum angle of light to be outputted from the light controlling sheet when the perfectly diffused light comes in the light controlling sheet and is a vertical half-maximum angle that is a half-maximum angle as measured in the upward and downward directions in a normally used state of the surface light source device, and when aH is a half-maximum angle of light to be outputted from the light controlling sheet when the perfectly diffused light comes in the light controlling sheet and is a horizontal half-maximum angle that is a half-maximum angle as measured in the leftward and rightward directions in a normally used state of the surface light source device, the following relationship is satisfied:

$$90°<aV+aH<115°.$$

The present invention is the surface light source device described above, wherein the following relationships are satisfied:

$$35°<aV<45° ; \text{ and}$$

$$55°<aH<70°.$$

The present invention is the surface light source device described above, wherein the unit optical structures formed on the light controlling sheet are of an asymmetrical shape in its cross section, and project toward the output light side, while being arranged in large numbers in a one-dimensional direction.

The present invention is the surface light source device described above, wherein each unit optical structure formed on the light controlling sheet includes a flat face side portion formed of a flat face and a curved face side portion formed of a curved face.

The present invention is the surface light source device described above, wherein the curved face side portion of each unit optical structure formed on the light controlling sheet is positioned on the upper side upon use, while the flat face side portion is positioned on the lower side upon use.

The present invention is the surface light source device described above, wherein an apex of each unit optical structure formed on the light controlling sheet includes a curved face smoothly connecting the asymmetrically formed respective faces together across the apex.

The present invention is the surface light source device described above, wherein the unit optical structure formed on the light controlling sheet projects toward the output light side and are arranged in large numbers in two-dimensional directions.

The present invention is the surface light source device described above, wherein the unit optical structure formed on the light controlling sheet include, in part, a shape formed as a substantially elliptical cylinder and/or include, in part, a shape formed as a substantially spheroidal body, and is arranged in large numbers, projecting toward the output light side.

The present invention is the surface light source device described above, wherein the light controlling sheet is formed from one kind of thermoplastic resin.

The present invention is a transmission display device, comprising: a transmission display portion; and a surface light source device, wherein the surface light source device is adapted for illuminating the transmission display portion from the back side, and includes: a light source portion having an output light face for outputting substantially perfectly diffused light; a light controlling sheet provided on the output light side relative to the light source portion and including unit optical structures each adapted to condense and/or diffuse light to be outputted from the light source portion; and a light diffusing sheet provided on the output light side relative to the light controlling sheet and including micro-convex structures formed on the output light side.

According to the present invention, the following effects can be obtained.

(1) Since the surface light source device comprises the light source portion, the light controlling sheet, and the light diffusing sheet provided on the output light side relative to the light controlling sheet and including micro-convex structures on its output light side, the output properties can be changed more smoothly, thus enhancing the front luminance, and preventing occurrence of moiré.

(2) Since the light source portion includes the light emitting portion and the perfect diffusing sheet, light can be radiated, with a more simplified construction, without unevenness of luminance due to the light emitting tubes.

(3) The light diffusing sheet includes: the base layer; the light diffusing layer provided on the base layer, wherein the light diffusing layer includes multiple micro-beads and a binder for binding the micro-beads, and wherein the portions in which the micro-beads are bound project toward the output light side relative to the portions in which the micro-beads are not bound and only the binder is included, thereby forming the micro-convex structures. Thus, some lens effect can be presented due to the micro-beads, and the output properties can be changed more smoothly due to the combination with the light controlling sheet. Additionally, the front luminance can be significantly improved, and the occurrence of moiré can be avoided.

(4) Since the haze value of the light diffusing sheet is 70% or higher, the effect of reducing moiré and unevenness of luminance due to the light emitting tubes can be enhanced as well as the light condensing effect due to the lens effect can be improved. If the haze value is less than 70%, the moiré in each lens pitch with pixels and unevenness of illumination caused by arrangement of the respective fluorescent lamps (i.e., the light emitting tubes) would appear. Besides, usage of a less amount of diffusing agents would lower the lens effect, as such deteriorating the front luminance.

(5) Since the light controlling sheet satisfies the relationship: $90<aV+aH<115°$, an improved light condensing effect can be securely obtained by the combination with the light diffusing sheet, thereby enhancing the front luminance.

(6) Since the light controlling sheet satisfies the relationships: $35<aV<45°$ and $55<°aH<70°$, an improved light condensing effect can be securely obtained by the combination with the light diffusing sheet, thus enhancing the front luminance.

(7) Since the total light transmitivity of the perfect diffusing sheet is within the range of 50% to 70%, the unevenness of luminance due to the arrangement of the light emitting tubes can be reduced or substantially eliminated, enhancing the efficiency of light utilization, as such ameliorating the front luminance.

(8) Since the unit optical structure formed on the light controlling sheet are of an asymmetrical shape in its cross section, and project toward the output light side, while being arranged in large numbers in a one-dimensional direction, the output properties can be controlled in the upward and downward directions as well as in the leftward and rightward directions.

(9) Since each unit optical structure formed on the light controlling sheet includes a flat face side portion formed of a flat face and a curved face side portion formed of a curved face, both the effect of enhancing the front luminance and the effect of making the change of luminance gentler and/or smoother can be obtained.

(10) Since the curved face side portion of each unit optical structure formed on the light controlling sheet is provided to be positioned on the upper side upon use, smoother change of the viewing angle can be presented in the upward viewing angle properties. While the flat face side portion is positioned on the lower side upon use and the change of the viewing angle thus becomes relatively large in the downward viewing angle properties, there is almost no chance to view the display device from below. However, due to the effect of the flat face side to be positioned on the lower side upon use, significant lowering of the luminance around 0° of the output angle can be prevented.

(11) Since the apex of each unit optical structure formed on the light controlling sheet includes a curved face smoothly connecting the asymmetrically formed respective faces together across the apex, the change of the viewing angle properties can be made smoother, and flaw to another sheet to be put on the light controlling sheet can be prevented.

(12) Since the unit optical structures formed on the light controlling sheet projects toward the output light side and are arranged in large numbers in two-dimensional directions, even in the case of employing a single light controlling sheet, the viewing angles both in the vertical and horizontal directions can be controlled.

(13) Since the unit optical structure formed on the light controlling sheet includes, in part, a shape formed as a substantially elliptical cylinder and/or includes, in part, a shape formed as a substantially spheroidal body, and are arranged in large numbers, projecting toward the output light side, the viewing angles properties both in the vertical and horizontal directions can be made smoother. In addition, since the apex portion is a curved face, flaw to another sheet to be in contact with such unit optical structures can be prevented.

(14) Since the light controlling sheet is formed from one kind of thermoplastic resin, durability against the environment can be enhanced.

DETAILED DESCRIPTION OF THE INVENTION

The object to provide smoother output light properties and higher front luminance and to avoid occurrence of moiré was achieved by combining a light source, a perfect diffusing sheet, a light controlling sheet having unit optical structures formed thereon, and a light diffusing sheet having microconvex structures formed on the output light side, together. By identifying the conditions required for the combination and satisfying them, a surface light source device and/or transmission display device, which can provide smoother output light properties and higher front luminance and avoid occurrence of moiré, can be obtained with ease.

EXAMPLES

Example 1

Figure 1:
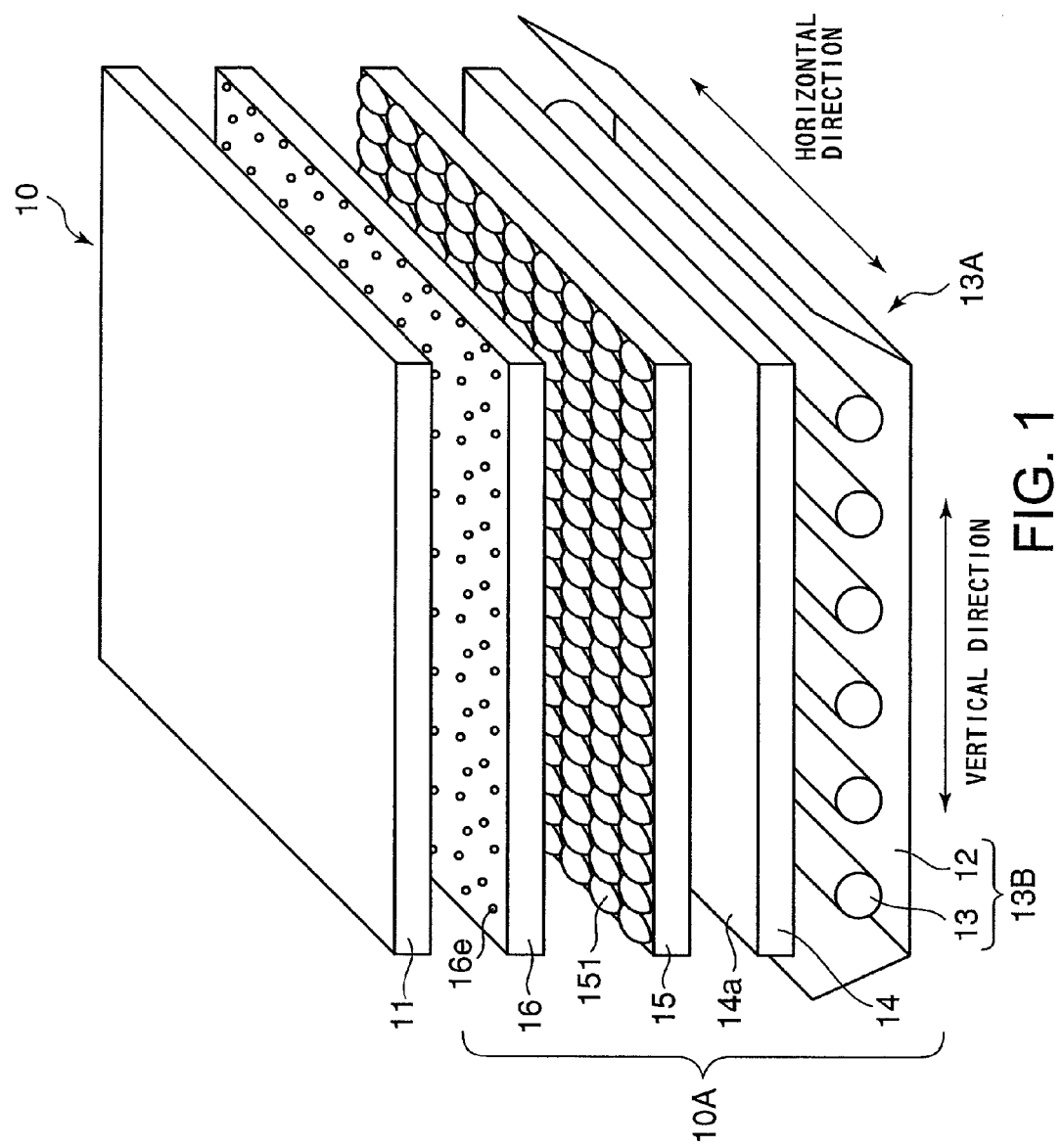
FIG. 1 is a diagram showing Example 1 of a transmission display device according to the present invention.

FIG. 1 is a diagram showing Example 1 of a transmission display device according to the present invention. The respective drawings provided, including FIG. 1, are schematically expressed, wherein the size and shape of each part or portion is appropriately exaggerated for facilitating understanding.

While the terms, "plate(s), sheet(s), film(s) and the like", are used herein, these expressions are used in the order, plate(s), sheet(s), and film(s), in order of the thickness, as commonly used. Thus, also in the description, these terms are used in accordance with this usage. However, since the use of these terms is not technologically critical, they are expressed collectively, as a sheet(s), in the claims. Accordingly, the terms, "plate(s), sheet(s), film(s)", may be appropriately exchanged for each other. For instance, the light controlling sheet may be replaced by the term, "a light controlling plate or light controlling film".

A transmission display device 10 of this example includes an LCD panel 11 and a surface light source device 10A for illuminating the LCD panel 11 from its back side to create image information to be displayed on the LCD panel 11. The surface light source device 10A includes a reflector 12, light emitting tubes 13, an opal plate (or perfect diffusing sheet) 14, a light controlling sheet 15, and a light diffusing sheet 16.

A light emitting portion 13B is composed of the reflector 12 and the light emitting tubes 13, and a light source portion 13A for generating perfectly diffused light is in turn composed of the light emitting portion 13B and the opal plate 14.

The light controlling sheet 15 includes multiple unit optical structures 151 provided to project on the output light side, as will be described below.

The light diffusing sheet 16 includes micro-convex structures 16e formed on the output light side, as will be described below.

The surface 14a of the opal plate 14 of the light source portion 13A constitutes an output light face of the light source portion 13A.

When the luminance measured in the normal line direction (or front face direction) of the output light face is defined as 100%, the term, "perfectly diffused light", means diffused light exhibiting 80% or greater luminance as measured in a direction angled 30 degrees relative to the normal line direction of the output light face as well as exhibiting 60% or greater luminance as measured in a direction angled 60 degrees relative to the normal line direction of the output light face.

The LCD panel 11 is composed of a transmission type liquid crystal display element, and is of a 32-inch (420 mm×740 mm) width across corners, so as to enable a display of 1280×768 resolution. It is noted that the direction along the longitudinal direction of each light emitting tube 13 is expressed herein as the horizontal direction, while the direction in which the light emitting tubes 13 are arranged is expressed as the vertical direction.

Each light emitting tube 13 is a fluorescent lamp (or cold-cathode tube) as a linear light source constituting the light emitting portion 13A of the surface light source device 10A. In this embodiment, eighteen (18) light emitting tubes 13 are arranged, in parallel, at an equal interval of approximately 20 mm. On the back side of the light emitting tubes 13, the reflector 12 is provided.

The reflector 12 is provided to cover the whole bottom surface of the assembly, on the opposite side (or back side) relative to the light controlling sheet 15, with respect to the light emitting tubes 13. The reflector 12 is configured to provide diffuse reflection to illuminating light advancing toward the back face side and direct it toward the light controlling sheet 15 (in the output light direction), so as to bring the illuminance of the incident or input light into a more uniformed state.

The opal plate 14 possesses non-directional light diffusion properties, and serves as a perfect diffusing sheet for diffusing light transmitted through the sheet and then outputting it as substantially perfectly diffused light. The opal plate 14 is located between the light emitting tubes 13 and the light controlling sheet 15. A mat finish is provided on both sides of the opal plate 14, and a diffusing agent is dispersed and incorporated in the base material of the opal plate 14, so as to provide some diffusion effect due to these means. As the material for the base material of the opal plate, polycarbonates, MS (methacryl styrenes: copolymers of acryl resins and styrene resins), and MBS (methyl methacrylate-butadiene-styrene copolymers) formed by incorporating rubber ingredients into the MS material, can be mentioned. Preferably, the base material of the opal plate has a thickness of approximately 1 mm to 3 mm. More specifically, the base material of the opal plate 14 of this example is formed to have a thickness of 2 mm, by using the MBS material, and exhibits a 60% total light transmitivity, a 95% luminance as measured in a direction angled 30 degrees relative to the normal line direction of the output light face 14a, as well as an 82% luminance as measured in a direction angled 60 degrees relative to the normal line direction of the output light face 14a.

The opal plate 14 may be of a multi-layered structure in order to enhance the moisture resistance. For instance, in the case of the MS materials and/or MBS materials, a sandwich structure may be formed by using such styrene-rich materials. Besides, in order to reduce or eliminate ultraviolet rays to be generated from the light emitting portion 13B, a UV absorbent may be mixed in the base material, or a UV absorbent may be coated on the surface of the opal plate 14 on the side of the light emitting portion 13B.

As one benefit to be provided by providing the opal plate 14, reduction of unevenness of illumination caused by arrangement of the light emitting tubes 13 can be mentioned. Namely, because the light emitting tubes 13 comprises fluorescent lamps, unevenness of illumination, i.e., some difference between brightness and darkness, may be caused by respective positions in which the fluorescent lamps 13 are provided and not provided. In order to address this problem, it is effective to spread light, by extending the distance between the LCD panel 11 and the surface light source device 10A and/or by utilizing a diffusion effect or lens effect of the surface light source device 10A. However, it is desired that the surface light source device 10A has a thickness which is as thin as possible. In addition, the surface light source device 10A can not be spaced, more than approximately 20 mm, away from the LCD panel 11. Thus, the degree or capacity of light diffusion and/or lens effect due to the opal plate (perfect diffusing sheet) 14 and/or light controlling sheet 15 becomes key factors. This equally applies to the case of using point light sources, such as LED (light emitting diode) light sources, instead of using the fluorescent lamps 13.

In the present invention, a combination of the opal plate 14, light controlling sheet 15 and light diffusing film 16 is utilized. Accordingly, the unevenness of illumination to be caused by the light emitting tubes 13 should be assessed with respect to such combined bodies. Our studies for such various combinations revealed that the degree of light diffusion due to the opal plate 14 is most effective against the unevenness of illumination caused by the light emitting tubes 13, and that it is preferred that the total light transmitivity of the opal plate 14 is in the range of 50% to 70% in order to reduce such unevenness of illumination by using the opal plate 14.

Now, the reasons for providing the above conditions will be described.

As the degree of light diffusion due to the opal plate 14 is increased, the unevenness of illumination to be caused by the light emitting tubes 13 is more reduced. Back scattering, however, is also increased, as such deteriorating the efficiency of utilizing the light, thus leading to lowering the front luminance. Accordingly, balancing of both of the factors is quite important. As the standard of the degree of light diffusion for the perfect diffusing sheet, the total light transmitivity can be mentioned.

Thus, preparing a variety of opal plates which are different in the total light transmitivity, we assessed both of the unevenness of illumination and the front luminance, for each opal plate.

The measurement of the total light transmitivity was performed by using a haze mater (JISK7136). Meanwhile, the measurement of the front luminance was conducted with the LCD panel 11 removed from the construction, shown in FIG. 1, of the 32-inch (420 mm×740 mm) width across corners. In the measurement, preparing five types of opal plates 14 (i.e., five types of samples wherein the total light transmitivity rates were different from one another), a luminance meter (BM-9, produced by Topcon Co.) was set 1 m far away from the surface light source device 10A, so as to be vertical to the surface light source device 10A, for conducting the measurement. The measuring point was set at approximately the center of the surface light source device 10A. Under such conditions, changes of the front luminance were measured, based on the opal panel 14 having the total light transmitivity of 60%. The results are shown in Table 1.

TABLE 1

| Total light transmitivity | Unevenness of illumination caused by the light emitting tubes | Front luminance |
|---|---|---|
| 45% | Not found | 10% DOWN |
| 55% | Not found | 4% DOWN |
| 60% | Almost no occurrence | Reference Plate |
| 65% | Almost no occurrence | 3% UP |
| 75% | Occurrence was found | 8% UP |

In the case where the total light transmitivity was 45%, while the unevenness of illumination caused by the light emitting tubes was not found, the front luminance was lowered by 10%. Thus, this is not practical.

In the case where the total light transmitivity was 55%, the unevenness of illumination was not found, and the lowering of the front luminance was controlled only up to 4%. Therefore, this is acceptable to use.

In the case where the total light transmitivity was 65%, almost no unevenness of illumination was found. Additionally, the front luminance was increased by 3%. Thus, this is acceptable to use.

In the case where the total light transmitivity was 75%, the unevenness of illumination caused by the light emitting tubes was found. Accordingly, although the front luminance was enhanced up to 8%, this is not acceptable to use.

From the results of Table 1, the preferred range of the total light transmitivity for the opal plate 14 is 50% to 70%.

Figure 2:
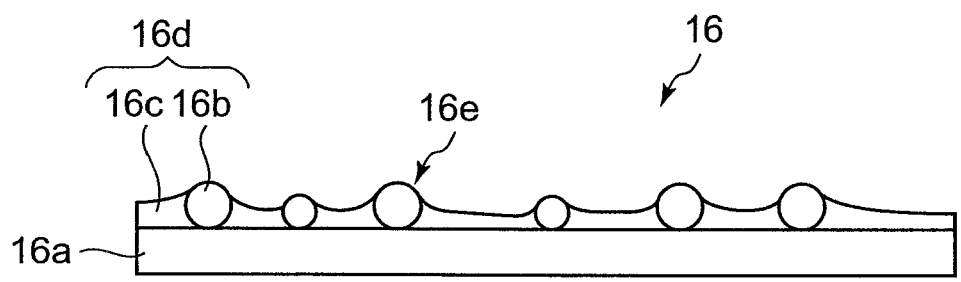
FIG. 2 is a cross section of a light diffusing sheet 16.

FIG. 2 is a cross section of the light diffusing sheet 16.

The light diffusing sheet 16 is located between the LCD panel 11 and the light controlling sheet 15, and has micro-convex structures formed on its output light side, so as to provide a light diffusion effect.

The types used as the light diffusing sheet 16 includes a type formed by coating a diffusing material on the surface of a transparent base film, a type formed by kneading a diffusing material into the base material, a type formed by roughening the surface, and those of combinations thereof.

Among these types, the light diffusing sheet 16 employed in this example is the one formed by coating a diffusing material on the surface of a transparent base film 16a. Specifically, a light diffusing layer 16d formed by kneading micro-beads 16d into a binder 16c is provided, as a coat, on the transparent base layer (film) 16a formed from a PET (PolyEthylene Terephthalate) resin and having a 188 μm thickness. Thus, the light diffusing sheet 16 has the micro-convex structures 16e formed on the surface thereof, wherein the micro-convex structures 16e were created by projecting the micro-beads 16b over the surface of the binder 16c. The light diffusing sheet 16 employed in this example is a light diffusing film, BS-702, produced by Keiwa Co., Ltd., whose haze value is 89.20% (designated by the maker's catalog).

Since the diffusing sheet 16 having the coat, including the diffusing material (micro-beads) 16b, formed thereon includes top rounded portions due to the micro-beads 16b, it can provide some lens effect. Therefore, when diffused light of a wider viewing angle comes into the diffusing sheet 16, the sheet can exhibit a light condensing effect. Contrary, when diffused light of a narrower viewing angle comes into the diffusing sheet 16, it can provide some light diffusing effect. That is, the diffusing sheet 16 possesses unique effects other than those to be provided by the diffusion sheets of the other types.

Since the diffusing material is coated in a dispersed state, there is no periodical structure, thus avoiding occurrence of moiré.

Additionally, by altering the amount of the diffusing material to be coated on the surface, proper adjustment for the lens effect (light condensing and diffusing effects) can be achieved. For instance, a less amount of the diffusing material leads to a more reduced density of the material, thus obtaining a higher scattering effect due to the so-roughened surface, rather than enhancing the lens effect. As a result, the light condensing effect is relatively lowered against diffused light of a wider viewing angle.

It should be noted that, among the light diffusing sheets as described above, the type formed by kneading a diffusing material into the base material and the type formed by roughening the surface are different from the light diffusing sheet 16 of this example, in that they do not exhibit the lens effect but possess only the light diffusing effect due to their light scattering effect and/or refracting effect.

Now returning to FIG. 1, the light controlling sheet 15 is provided between the opal plate 14 and the light diffusing sheet 16, and includes multiple unit optical structures 151 provided to project toward the output light side.

The unit optical structures 151 have a semi-spherical convex shape, and are arranged, in both of the horizontal and vertical directions, on the output light side of the light controlling sheet 15.

The light controlling sheet 15 of this example is formed by extrusion molding using a transparent MS material having a refractive index of 1.53. It should be noted that the light controlling sheet 15 is not limited to the MS material, but may be formed by appropriately selecting and using another thermoplastic resin having proper optical transparency, such as polycarbonates, MBS, PMMA, and styrene resins. Alternatively, the light controlling sheet 15 may be formed by employing a method called ultraviolet-ray molding, which uses a thermosetting resin together with a ultraviolet curing resin.

Figure 3:
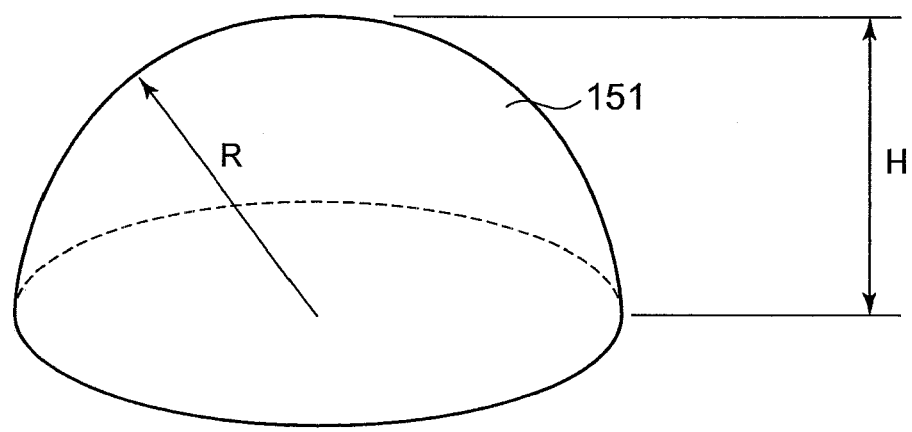
FIG. 3 is a schematic view showing a shape of a single unit optical structure 151.

FIG. 3 is a schematic view showing a shape of a single unit optical structure 151. Each unit optical structure 151 is provided on the light controlling sheet 15 such that it takes a semi-spherical structure having a radius of R and a projecting level of H.

It should be noted that each unit optical structure 151 of the light controlling sheet 15 may have a prism shape, such as a triangular pyramid or quadrangular pyramid, rather than the lens shape as employed in this example. It is preferred that the method of arranging the unit optical structures 151 is the so-called closest arrangement in which these structures are arranged in quadrangular or hexagonal shapes.

Next, preferred optical properties of the light controlling sheet 15 in the case of employing the combination of the light controlling sheet 15 and the light diffusing sheet 16 will be discussed.

For the study of the optical properties, four types of light controlling sheets 15, i.e., sheets 15-1 to 15-4, as shown in Table 2 below, were prepared in this example. The reference characters H, R in Table 2 denote the dimensions respectively shown in FIG. 3.

TABLE 2

|  | H | R | αV αH | Peak luminance (cd/m$^2$) |
|---|---|---|---|---|
| 15-1 | 0.05 mm | 0.2 mm | 60 deg. | 8339.7 |
| 15-2 | 0.08 mm | 0.2 mm | 55 deg. | 8495.6 |
| 15-3 | 0.1 mm | 0.2 mm | 50 deg. | 9165.8 |
| 15-4 | 0.15 mm | 0.2 mm | 45 deg. | 9392.5 |

For the light controlling sheets 15-1 to 15-4 shown in Table 2, the output angle (or viewing angle) properties of the output light were measured in order to obtain the half-maximum angle aV in the vertical direction and the half-maximum angle aH in the horizontal direction. The measurements of the front luminance and output angle properties were conducted, by using a viewing-angle-properties measuring device (EZContrast, produced by ELDIM Co.), with the LCD panel 11 and light diffusing sheet 16 removed from the configuration shown in FIG. 1. The output angle refers to an angle defined between the output light and the normal line of the sheet surface. Further, the sheet surface refers to a plane to be defined in the direction along the plane of the light controlling sheet 15, when it is viewed over the entire body of the light controlling sheet 15. In this example, the sheet surface is a plane that is parallel to the surface on the incident light side of the light controlling sheet 15, and it will have the same definition through the description provided below.

Figure 4:
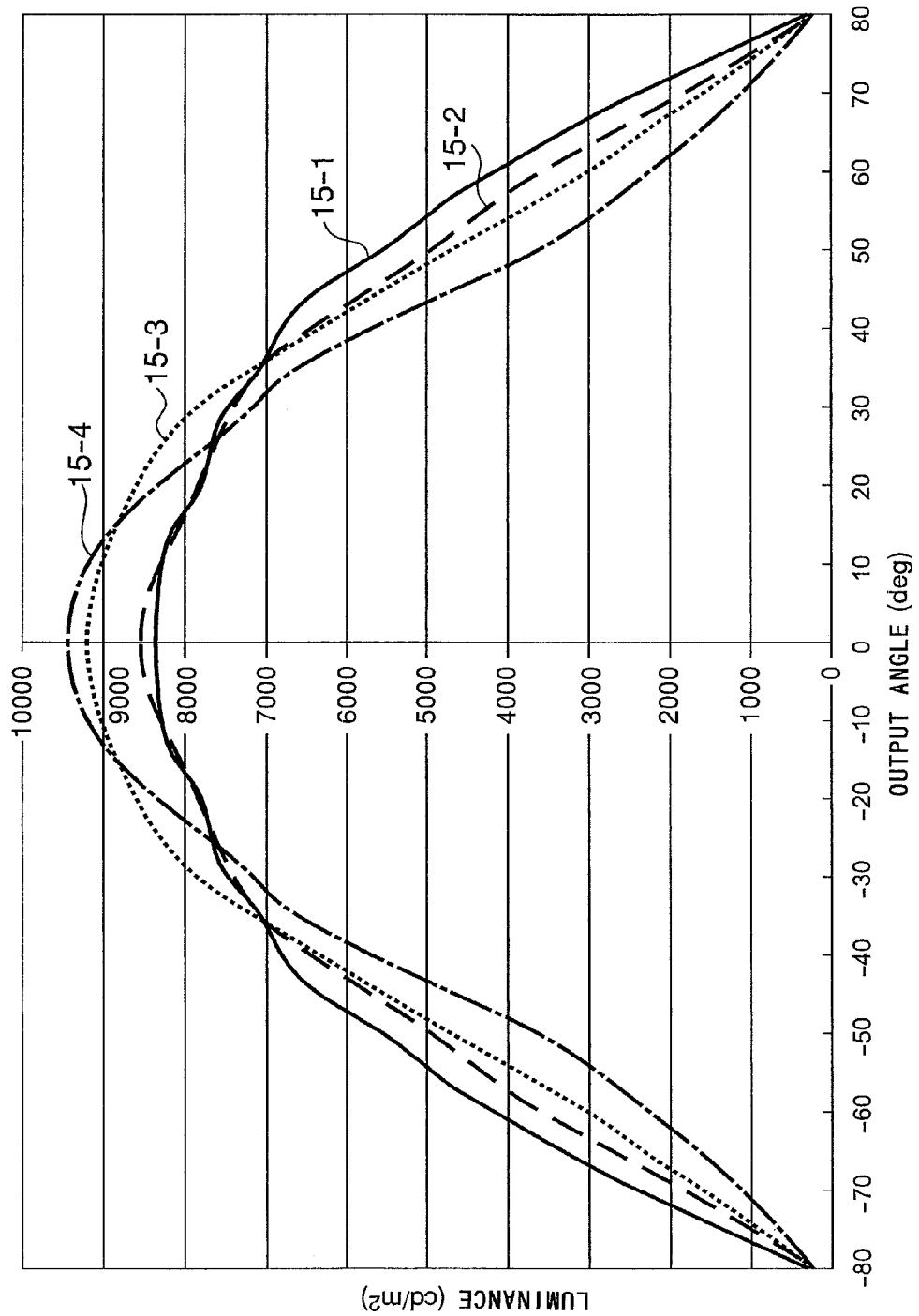
FIG. 4 is a diagram showing measurement results of the output angle (or viewing angle) properties of light controlling sheets 15-1 to 15-4.

FIG. 4 is a diagram showing measurement results of the output angle (or viewing angle) properties of the light controlling sheets 15-1 to 15-4. The horizontal axis of FIG. 4 expresses the output angle, and the vertical axis designates the luminance (cd/m$^2$ (nit)).

Each half-maximum angle obtained from the measurement results of FIG. 4 was listed in Table 2 provided above.

In this case, the light diffusing sheet 16 was put on the output light side of each light controlling sheet 15-1 to 15-4 shown in Table 2 and FIG. 4, so as to measure the output angle properties, thereby to check changes in the front luminance, half-maximum angle aV in the vertical direction, and aH in the horizontal direction. It is noted that the measurements for the front luminance and the output angle properties were conducted by using the aforementioned output-angle-properties measuring device EZContrast, with the LCD panel 11 removed from the configuration shown in FIG. 1.

Figure 5:
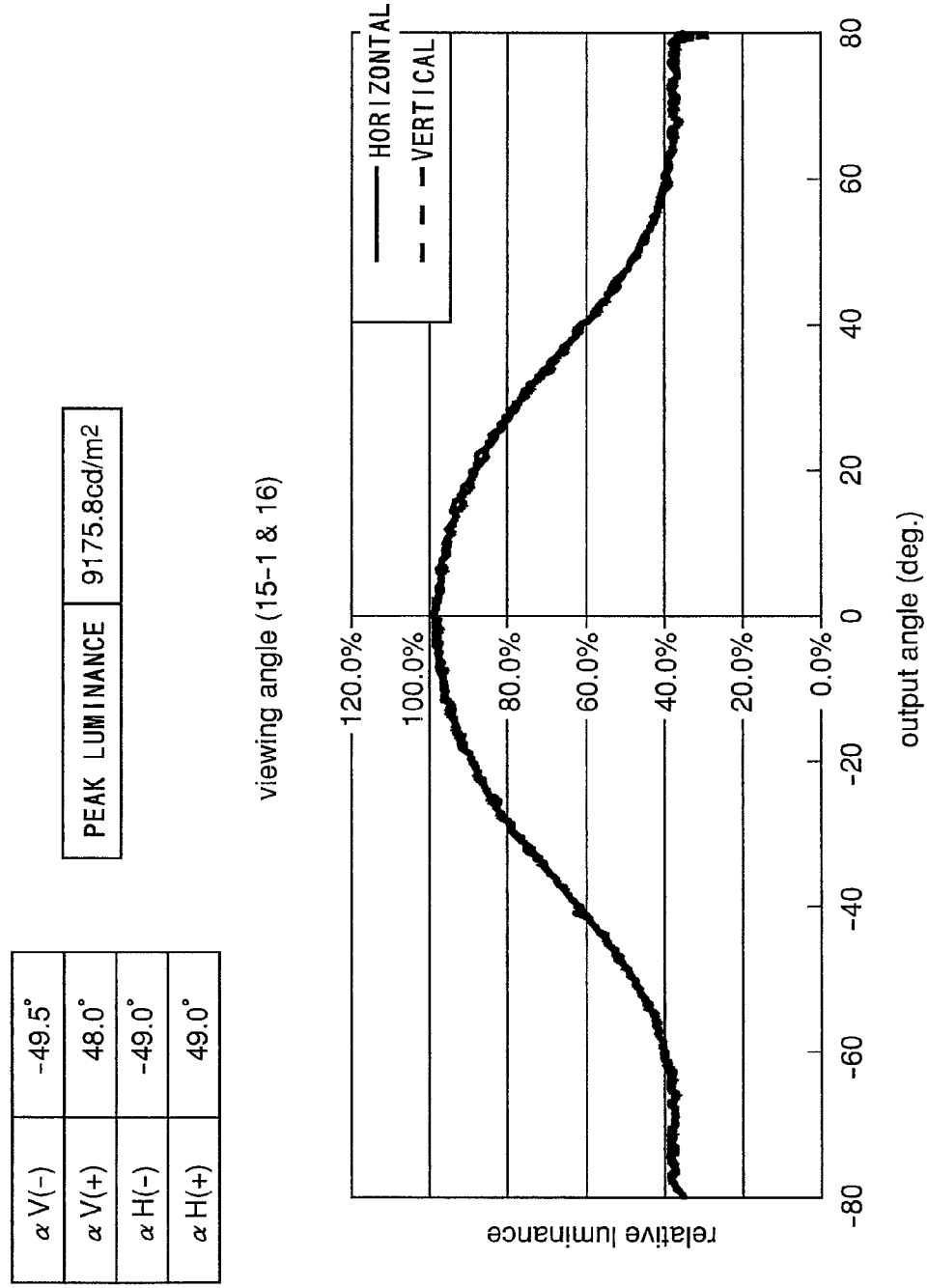
FIG. 5 is a diagram showing measurement results of the output angle properties in the case where the light diffusing sheet 16 is put on the output light side of the light controlling sheet 15-1.

FIG. 5 is a diagram showing measurement results of the output angle properties in the case where the light diffusing sheet 16 is put on the output light side of the light controlling sheet 15-1.

Figure 6:
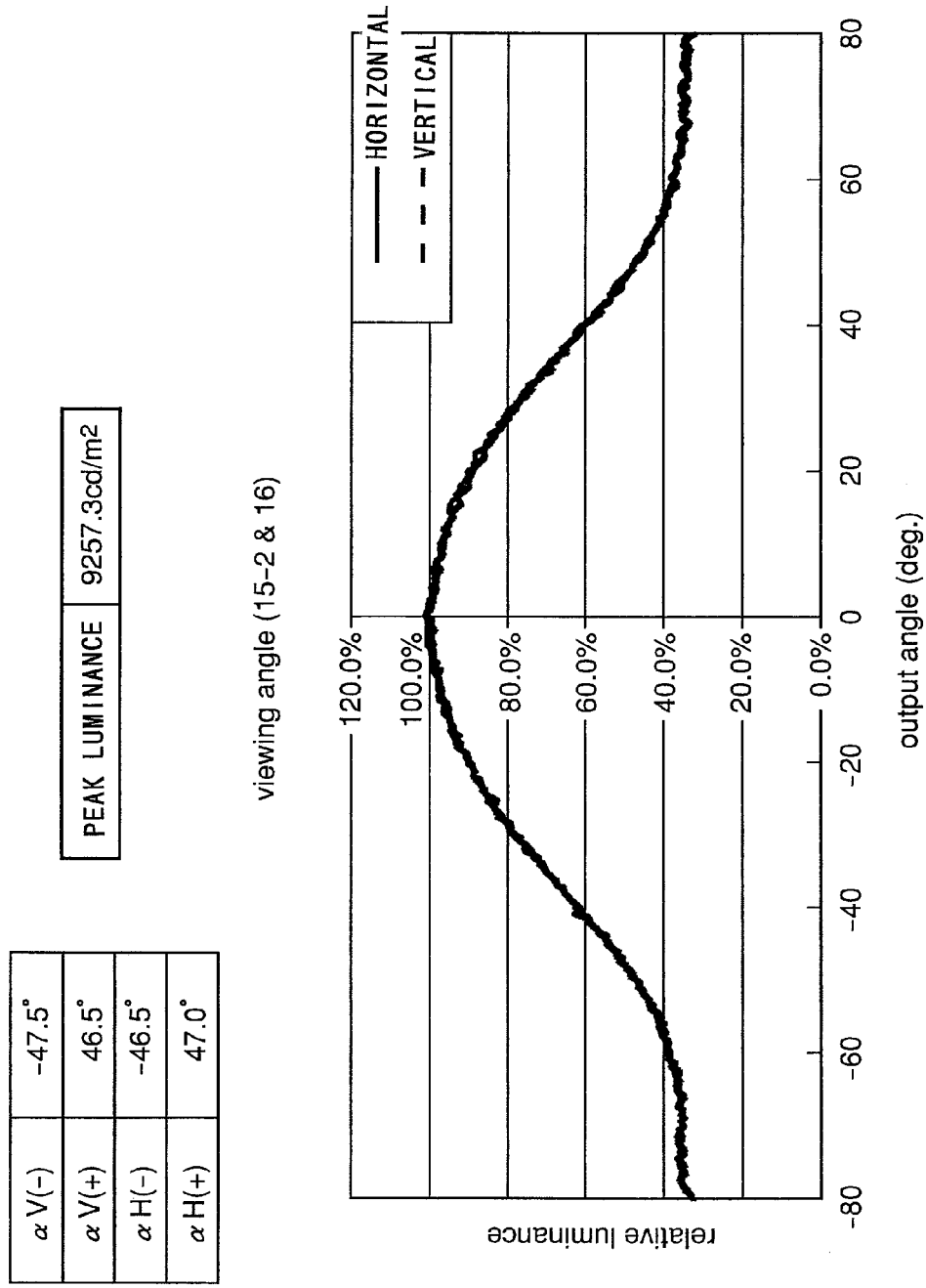
FIG. 6 is a diagram showing measurement results of the output angle properties in the case where the light diffusing sheet 16 is put on the output light side of the light controlling sheet 15-12.

FIG. 6 is a diagram showing measurement results of the output angle properties in the case where the light diffusing sheet 16 is put on the output light side of the light controlling sheet 15-12.

Figure 7:
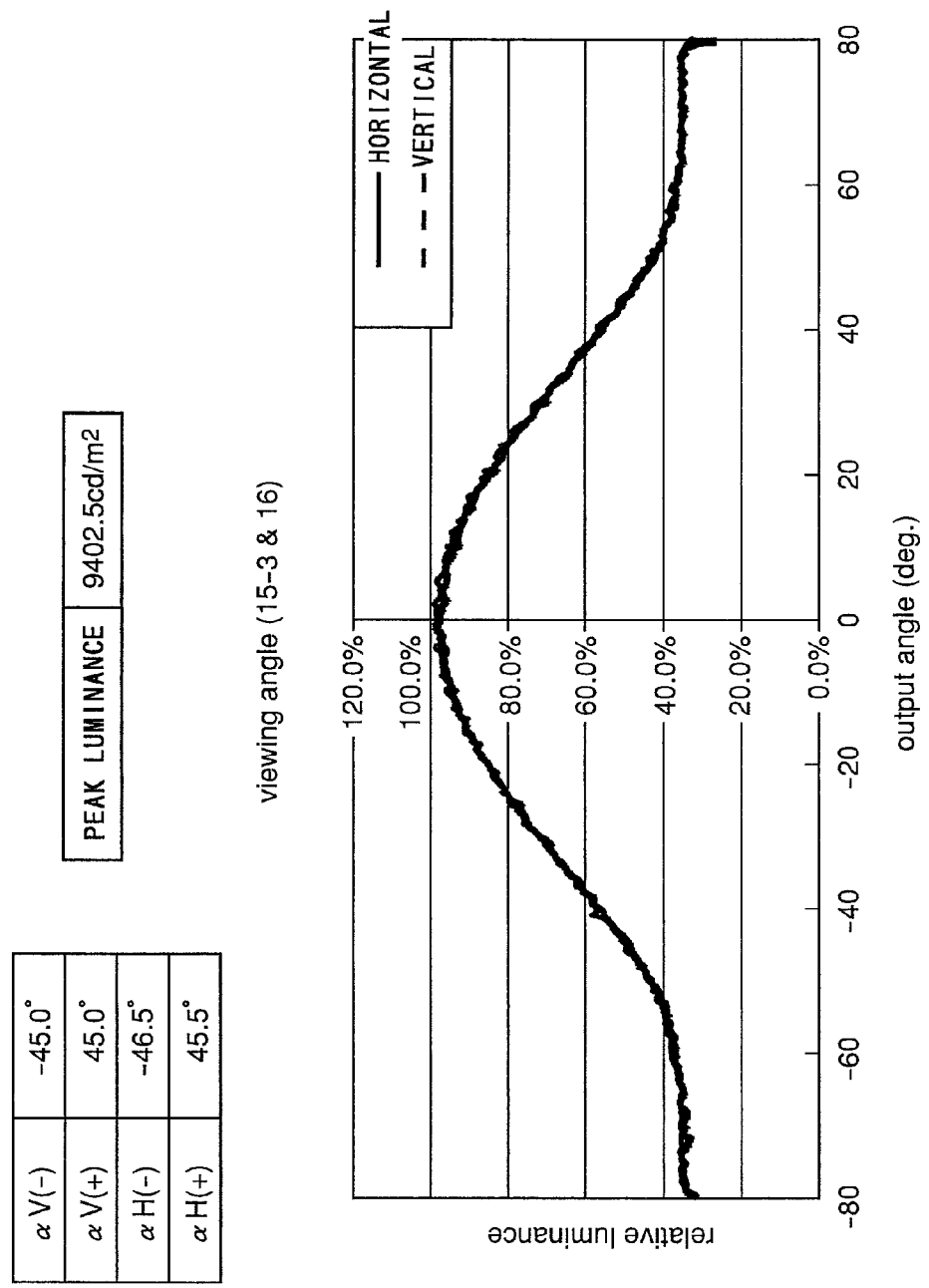
FIG. 7 is a diagram showing measurement results of the output angle properties in the case where the light diffusing sheet 16 is put on the output light side of the light controlling sheet 15-3.

FIG. 7 is a diagram showing measurement results of the output angle properties in the case where the light diffusing sheet 16 is put on the output light side of the light controlling sheet 15-3.

Figure 8:
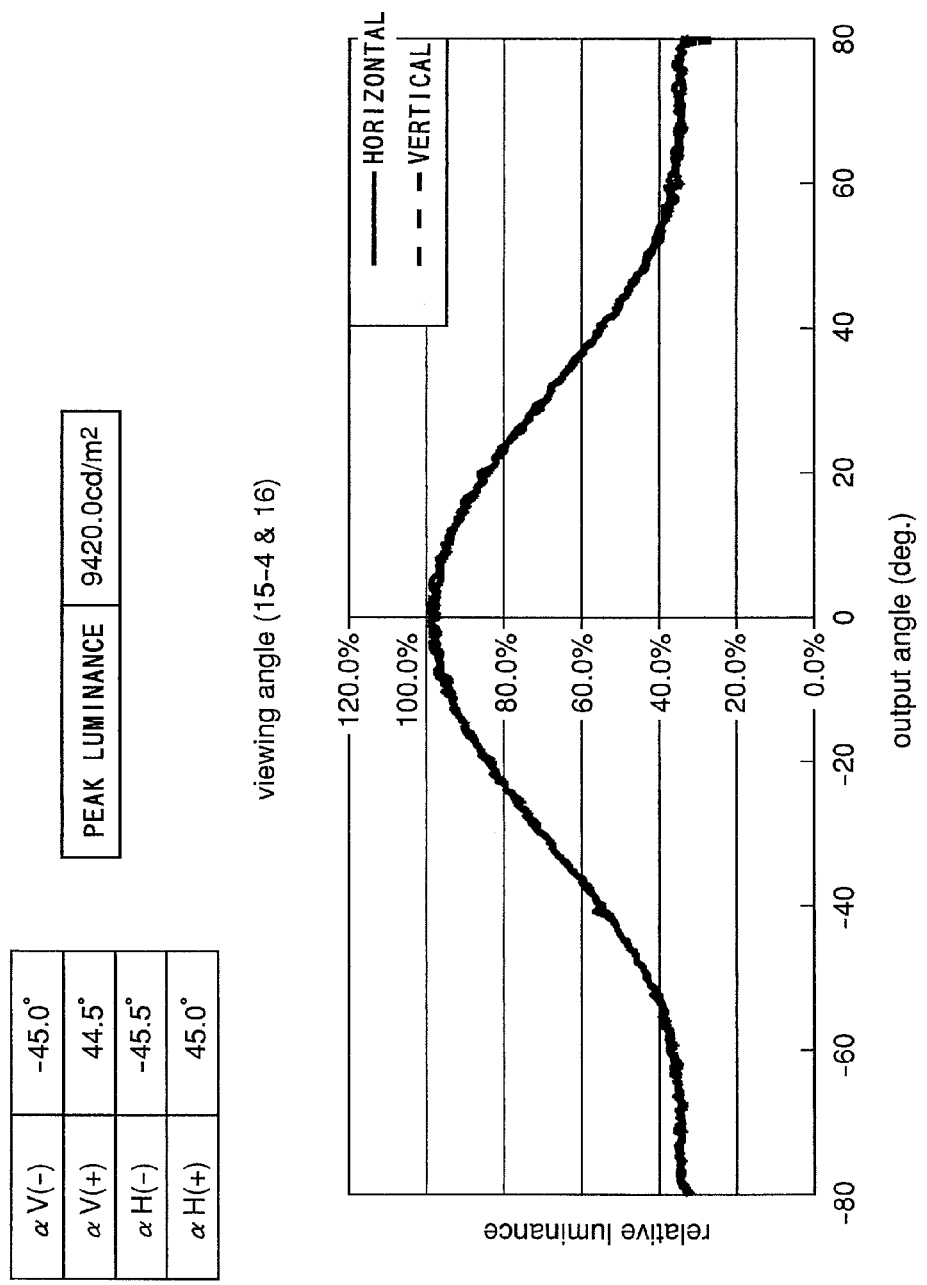
FIG. 8 is a diagram showing measurement results of the output angle properties in the case where the light diffusing sheet 16 is put on the output light side of the light controlling sheet 15-4.

FIG. 8 is a diagram showing measurement results of the output angle properties in the case where the light diffusing sheet 16 is put on the output light side of the light controlling sheet 15-4.

In FIGS. 5 to 8, the horizontal axis of the graph designates the output angle, and the vertical axis expresses the relative luminance when the peak luminance (equal to the front luminance (measured in the direction corresponding to 0° of the output angle)) is 100%. Additionally, in FIGS. 5 to 8, the peak luminance obtained is expressed together with the half-maximum angle aV in the vertical direction and the half-maximum angle aH in the horizontal direction. It is noted that aV(+) and aH(+) express the half-maximum angle in the positive direction, respectively, while aV(−) and aH(−) express the half-maximum angle in the negative direction, respectively. Furthermore, the positive direction designates the downward direction in the vertical direction and the leftward direction in the horizontal direction, while the negative direction designates the upward direction in the vertical direction and the rightward direction in the horizontal direction.

As the surface light source device 10A, a wider half-maximum angle of illuminating light just before coming in the LCD panel 11 is more preferable, if not considering the front luminance. However, if outputting the light while spreading it in a wider range, the front luminance should be deteriorated. Therefore, it is preferred to adjust the output angle within a necessarily narrowed angular range in order to enhance the front luminance. In common applications, such as liquid crystal television sets or the like, it is preferred that the half-maximum angle is adjusted in a range of approximately 35° to 45° in the vertical direction and in a range of approximately 45° to 55° in the horizontal direction in order to enhance the front luminance as much as possible.

Of course, the illuminating light for the surface light source device 10A is not outputted only in the vertical direction or only in the horizontal direction, but is radiated in an omnidirectional range. Thus, three-dimensional discussion for the light can provide more accurate output properties. However, it is commonly recognized that as the light radiated in the horizontal direction is decreased, the light to be outputted in the vertical direction will be increased. Therefore, studies for the output properties with respect to the two directions, the horizontal and vertical directions, will be enough for the practical use and hence facilitate the discussion about such properties. As such, the output properties of the light controlling sheet 15 will be described herein with respect to the combination of the half-maximum angle aV in the vertical direction and the half-maximum angle aH in the horizontal direction.

As is seen from the results shown in FIG. 5, when putting the light diffusing sheet 16 on the light controlling sheet 15-1 having the half-maximum angle aV of 60° in the vertical direction and the half-maximum angle aH of 60° in the horizontal direction, the half-maximum angle aV in the vertical direction will be in a range of 48° to 49° while the half-maximum angle aH in the horizontal direction will be 49°, exhibiting a better light condensing effect, and the peak luminance is also enhanced from 8339.7 (cd/m$^2$) to 9175.8 (cd/m$^2$).

Accordingly, by putting the light diffusing sheet 16 on the light controlling sheet 15-1, a better light condensing effect can be obtained, thereby to enhance the peak luminance. However, the obtained results do not satisfy the conditions described above for enhancing the peak luminance by adjusting the half-maximum angle in the vertical direction within the range of approximately 35° to 45° and that in the horizontal direction within the range of approximately 45° to 55°. Thus, further light condensing effect must be required in the stage of the light controlling sheet 15.

As is seen from the results shown in FIG. 6, when putting the light diffusing sheet 16 on the light controlling sheet 15-2 having the half-maximum angle aV of 55° in the vertical direction and the half-maximum angle aH of 60° in the horizontal direction, the half-maximum angle aV in the vertical direction will be in a range of 46.5° to 47.5° while the half-maximum angle aH in the horizontal direction will be in a range of 46.5° to 47°, exhibiting a better light condensing effect, and the peak luminance is also enhanced from 8495.6 (cd/m$^2$) to 9257.3 (cd/m$^2$).

Accordingly, it is effective to put the light diffusing sheet 16 on the light controlling sheet 15-2. Namely, it is found that it is necessary to condense the light, by using the light controlling sheet 15, to an extent corresponding to the conditions that both of the half-maximum angle aV in the vertical direction and the half-maximum angle aH in the horizontal direction become 55°, in order to obtain effective results by putting the light diffusing sheet 16 on the light controlling sheet 15.

As is seen from the results shown in FIG. 7, when putting the light diffusing sheet 16 on the light controlling sheet 15-3 having the half-maximum angle aV of 50° in the vertical direction and the half-maximum angle aH of 50° in the horizontal direction, the half-maximum angle aV in the vertical direction will be 45° while the half-maximum angle aH in the horizontal direction will be in a range of 45.5° to 46.5°, exhibiting a better light condensing effect, and the peak luminance is also enhanced from 9165.8 (cd/m$^2$) to 9402.5 (cd/m$^2$).

Accordingly, it is significantly effective to put the light diffusing sheet 16 on the light controlling sheet 15-3.

As is seen from the results shown in FIG. 8, when putting the light diffusing sheet 16 on the light controlling sheet 15-4 having the half-maximum angle aV of 45° in the vertical direction and the half-maximum angle aH of 45° in the horizontal direction, the half-maximum angle aV in the vertical direction will be in a range of 44.5° to 45° while the half-maximum angle aH in the horizontal direction will be in a range of 45° to 45.5°, as such exhibiting almost no light condensing effect, and the peak luminance is changed only from 9392.5 (cd/m$^2$) to 9420.0 (cd/m$^2$). This can be regarded as almost no change.

Accordingly, it is not ideal to put the diffusing sheet 16 on the light controlling sheet 15-4, from a viewpoint of the peak luminance. However, it can provide some benefit for reducing the moiré.

From the results shown in FIG. 8, the limit which can provide effective results by putting the diffusing sheet 16 on the light controlling sheet 15 is setting the half-maximum angle at approximately 45°, at which the light comes in the diffusion sheet 16.

The results of FIGS. 5 to 8 can be summarized as follows.
(1) For the diffused light having the half-maximum angle of 55° or greater, some light condensing effect can be obtained, but the viewing angle can not be narrowed, thus deteriorating the front luminance.
(2) For the diffused light having the half-maximum angle of 45° or less, the light condensing effect due to the microbeads 16b in the light diffusing sheet 16 can not be obtained sufficiently.

Namely, in order to enhance the peak luminance while obtaining a proper light condensing effect, by using the light diffusing sheet 16 of this example, it is preferred that the light controlling sheet 15 satisfies the following condition.

$$90° < aV + aH < 115°  \quad \text{(Equation 1)}$$

The upper limit, 115°, of the Equation 1 is set to cover a value to be obtained by adding the half-maximum angle aV of 55° in the vertical direction and the half-maximum angle aH of 55° in the horizontal direction, in the case of the light controlling sheet 15-2 which has been demonstrated, from the results shown in FIG. 6, to provide the maximum half-maximum angle (55°) for obtaining effective results when putting the light diffusing sheet 16 thereon.

The lower limit, 90°, of the Equation 1 corresponds to a value to be obtained by adding the half-maximum angle aV of 45° in the vertical direction and the half-maximum angle aH of 45° in the horizontal direction, the lower limit values obtained from the results shown in FIG. 8.

As described above, it is preferred to set the half-maximum angle in the horizontal direction greater than the half-maximum angle in the vertical direction. From this point of view, the Equation 1 may be separated into the horizontal directional component and the vertical directional component, as expressed in the following Equation 2. Namely, the light controlling sheet 15 may satisfy the Equation 2.

$$35° < aV < 45°, 55° < aV < 70° \quad \text{(Equation 2)}.$$

As described above, the haze value of the light diffusing sheet 16 used in this example is 89.2%. It should be noted that as the haze value of the light diffusing sheet 16 is decreased, a sufficient light condensing effect will be difficult to obtain. Therefore, in order to study the influence due to the haze value, a light diffusing sheet having the haze value of 47.9 was prepared as a comparative example, so as to check the output angle properties in the case of using it in place of the light diffusing sheet 16.

Figure 14:
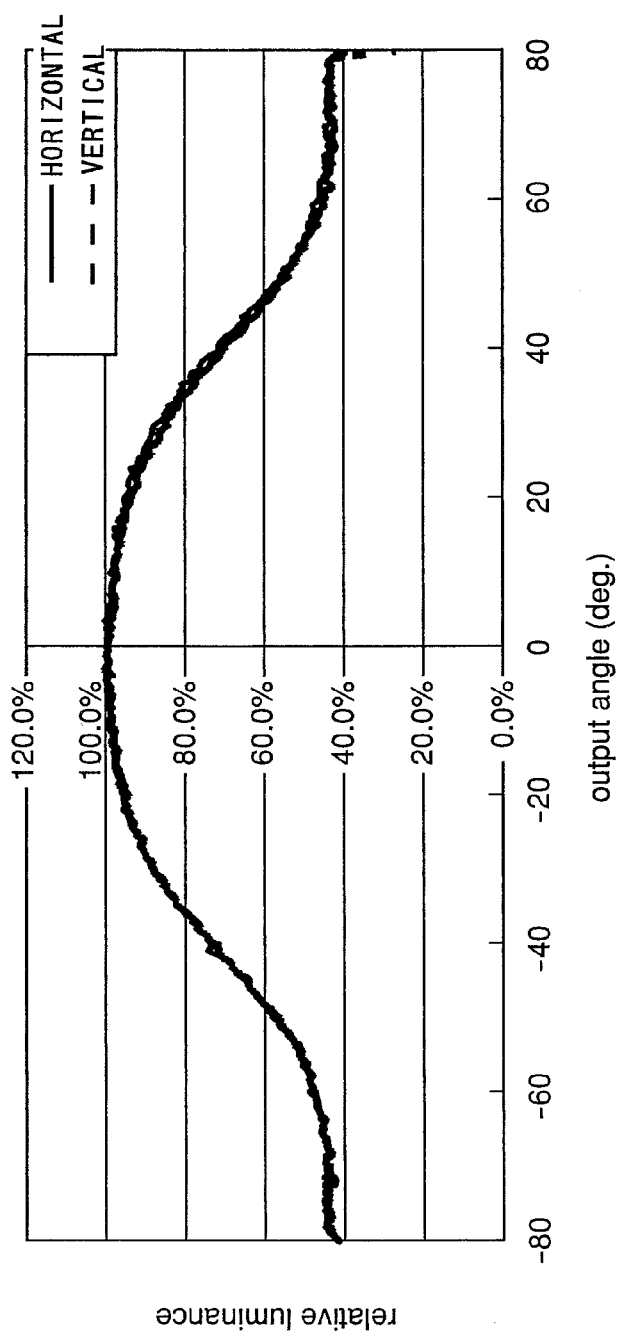
FIG. 14 is a diagram showing measurement results of the output angle properties in the case where a light diffusing sheet of a comparative example is put on the output light side of the light controlling sheet 15-1.

FIG. 14 is a diagram showing measurement results of the output angle properties in the case where the light diffusing sheet as the comparative example is put on the output light side of the light controlling sheet 15-1.

Comparing the results of FIG. 14 with those of FIG. 5, it is found that, in the case of the comparative example of FIG. 14 having the lower haze value, the half-maximum angle aV in the vertical direction will be in a range of 54.5° to 55.5° while the half-maximum angle aH in the horizontal direction will be in a range of 55.5° to 56.5°, exhibiting almost no light condensing effect. In addition, the peak luminance of this case is 8495.6 (cd/m$^2$), as such showing almost no change, as compared to the case of employing the light controlling sheet 15 alone. Furthermore, the moiré in each lens pitch of pixels and unevenness of illumination caused by arrangement of the light emitting tubes 13 could be found.

While the light diffusing sheet 16 has the haze value of 89.2% as described above, if the haze value is 70% or higher, a sufficient light condensing effect can be obtained, thereby to provide substantially the same effects as those shown in FIG. 5.

According to this example, only by setting the half-maximum angle of the light controlling sheet 15 so as to satisfy the Equation (1) and/or Equation (2), a surface light source device can be obtained, which can condense light effectively in a desired area, enhance the peak luminance, prevent occurrence of the moiré, and achieve significantly smoother change of the luminance.

Example 2

Figure 9:
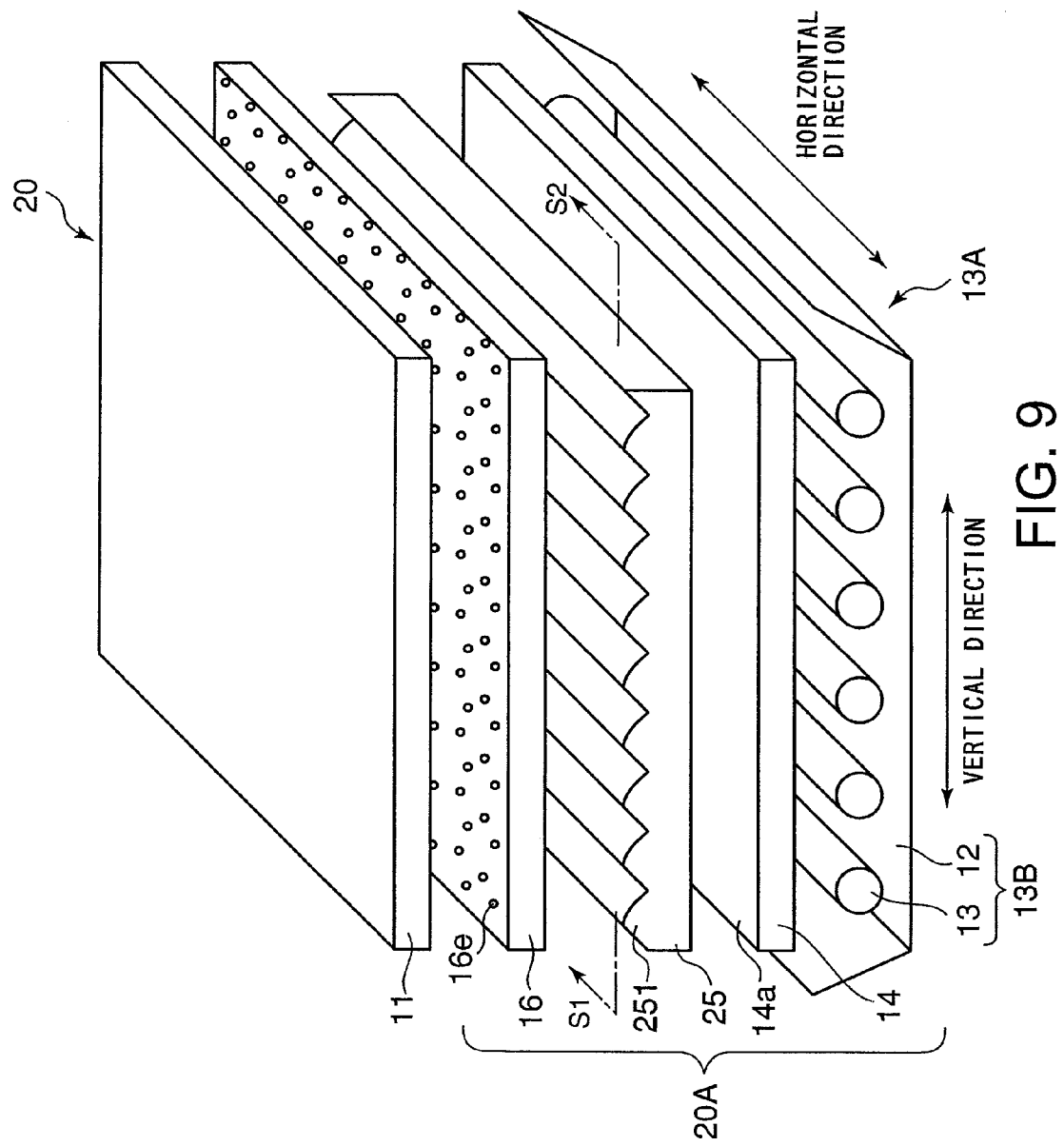
FIG. 9 is a diagram showing Example 2 of a transmission display device according to the present invention.

FIG. 9 is a diagram showing Example 2 of a transmission display device according to the present invention.

A transmission display device 20 of the Example 2 is one example in which the light controlling sheet 15 of the Example 1 is replaced by a light controlling sheet 25 that is different in the unit optical structures.

The transmission display device 20 of this example includes the LCD panel 11 and a surface light source device 20A for illuminating the LCD panel 11 from its back side to create image information to be displayed on the LCD panel 11. The surface light source device 20A includes the reflector 12, the light emitting tubes 13, the opal plate (or perfect diffusing sheet) 14, the light controlling sheet 25, and the light diffusing sheet 16.

The light emitting portion 13B is composed of the reflector 12 and the light emitting tubes 13, and the light source portion 13A for generating perfectly diffused light is in turn composed of the light emitting portion 13B and the opal plate 14.

The light controlling sheet 25 includes multiple unit optical structures 251 provided to project on the output light side.

The light diffusing sheet 16 includes the micro-convex structures 16e formed on the output light side.

The surface 14a of the opal plate 14 of the light source portion 13A constitutes an output light face of the light source portion 13A.

The light controlling sheet 25 is an optical sheet, which is configured to reduce unevenness of luminance of light to be outputted from the light emitting tubes 13 so as to make it uniform, and possesses a light condensing effect. On the light controlling sheet 25, unit optical structures 251 adapted to converge and output light toward the output light side are formed. Each unit optical structure 251 is of a shape formed by combining a flat face and a curved face. Such unit optical structures 251 are arranged on the output light side surface of the light controlling sheet 25, in parallel, in large numbers. The direction in which these unit optical structures 251 are arranged is coincident with the direction in which the light emitting tubes 13 are arranged.

The light controlling sheet 25 of this example is formed by extrusion molding using a transparent MS material having a refractive index of 1.53. It should be appreciated that the light controlling sheet 25 is not limited to the MS material, but may be formed by appropriately selecting and using another thermoplastic resin having proper optical transparency, such as polycarbonates, MBS, PMMA, and styrene resins. Alternatively, the light controlling sheet 25 may be formed by employing a method called ultraviolet-ray molding, which employs a thermosetting resin together with a ultraviolet curing resin.

Figure 10:
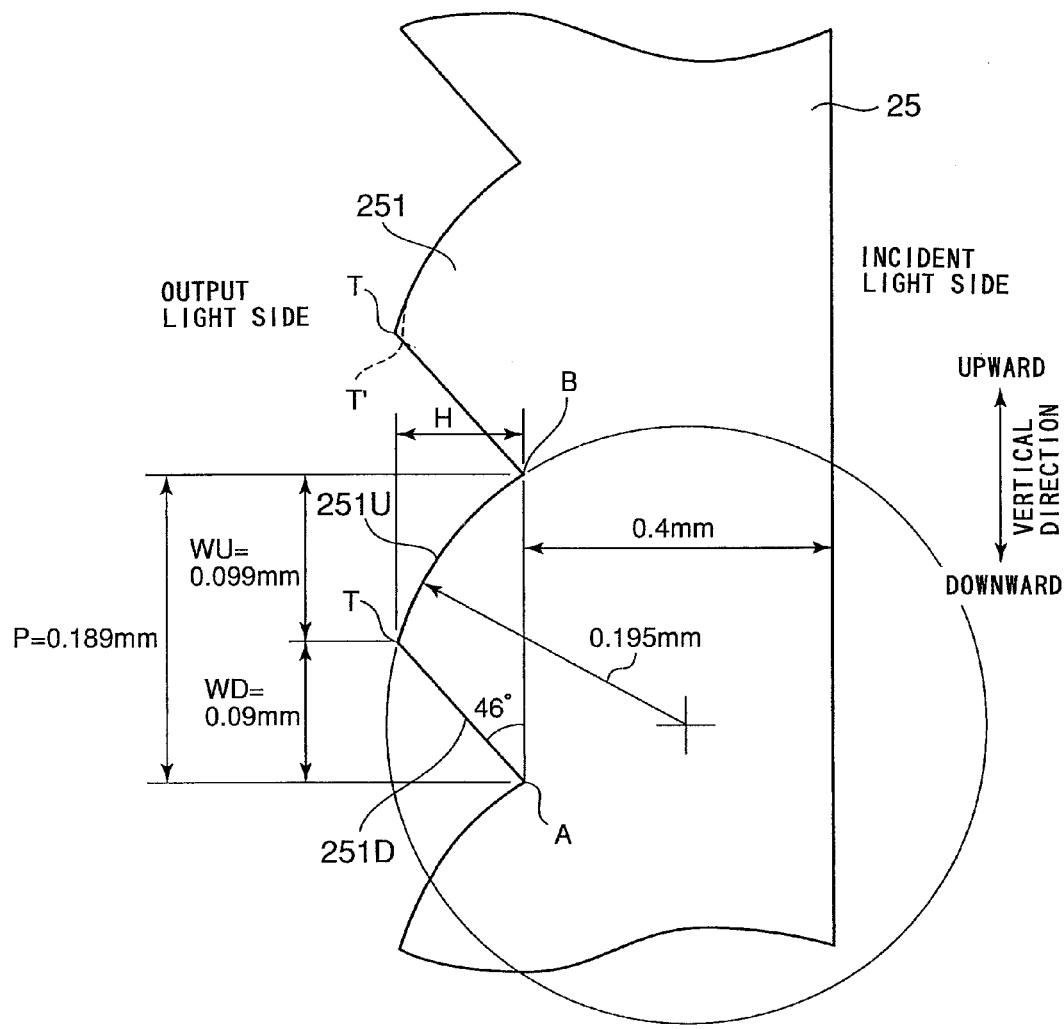
FIG. 10 is a cross section taken along line S1-S2 of a light controlling sheet 25 shown in FIG. 9.

FIG. 10 is a cross section taken along line S1-S2 of the light controlling sheet 25 shown in FIG. 9. FIG. 10 expresses an arrangement similar to that in the case of cutting the state of use as it is. Thus in the drawing, the upward and downward directions correspond to the vertical direction, and the leftward direction expresses the output light side. The shape of each unit optical structure 251 will be described with respect to an upper portion 251U and a lower portion 251D, which are connected together across an apex T.

The lower portion 251D is a flat face (or flat face side portion) having a width of 0.09 mm as measured in parallel with the sheet surface from a point A to the apex T, i.e., a width WD (0.09 mm) in the vertical direction of the cross section shown in FIG. 10. This lower portion 251D is provided to define an angle of 46 degrees relative to the sheet surface.

The upper portion 251U is a cylindrical face (or curved face side portion) having a radius of 0.195 mm and extending from a point B to the apex T, the point B being located a distance of 0.189 mm, upward in parallel to the sheet surface, from the point A. As such, the width WU in the vertical direction of the upper portion 251U is 0.099 mm. Accordingly, the ratio of the flat face side portion 251D and the curved face side portion 251U, in parallel to the sheet surface, of each unit optical structure 251, i.e., WD:WU=1:1.1.

Figure 11:
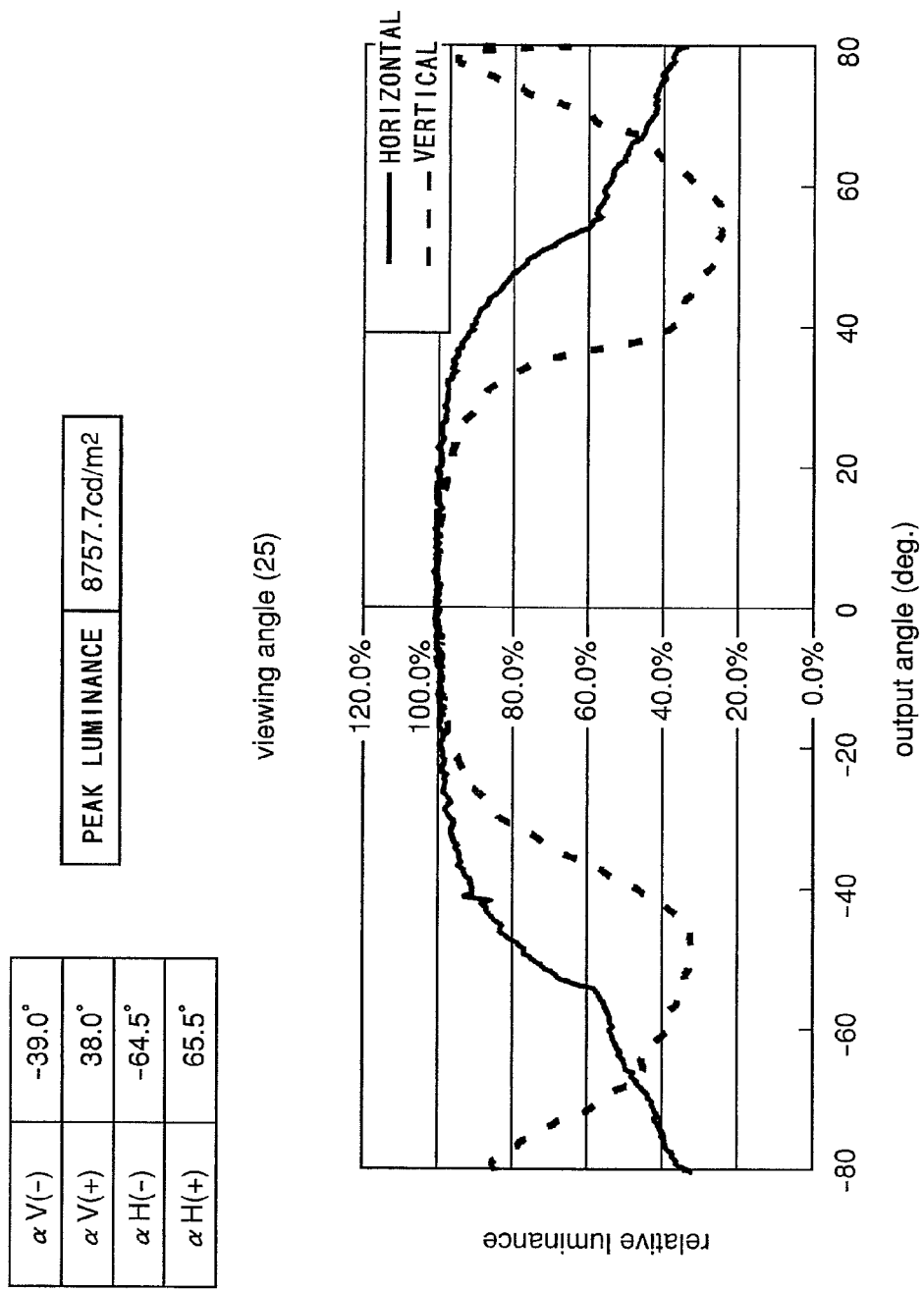
FIG. 11 is a diagram showing measurement results of the output angle properties of the light controlling sheet 25.

FIG. 11 is a diagram showing measurement results of the output angle properties of the light controlling sheet 25.

The measurement of the output angle properties was conducted by using the viewing-angle-properties measuring device EZContrast, with the LCD panel 11 and light diffusing sheet 16 removed from the configuration shown in FIG. 9.

Since the light controlling sheet 25 has the half-maximum angle aV in the vertical direction within a range of 38° to 39° and the half-maximum angle aH in the horizontal direction within a range of 64.5° to 65.5°, this sheet satisfies the Equation (1) and Equation (2) described in the above discussion of the Example 1.

In order to explain the operation or function of the asymmetrical unit optical structures, each having the upper portion 251U as the cylindrical face and the lower portion 251U as the flat face, in the light controlling sheet 25 of this example, a comparative example including triangular prisms, i.e., symmetrical unit optical structures, was prepared, and used it in the surface light source device to measure the output angle properties. In this case, the light controlling sheet including such triangular prisms used as the comparative example was BFF3 (Sumitomo Three-Em Co., Ltd.).

Figure 12:
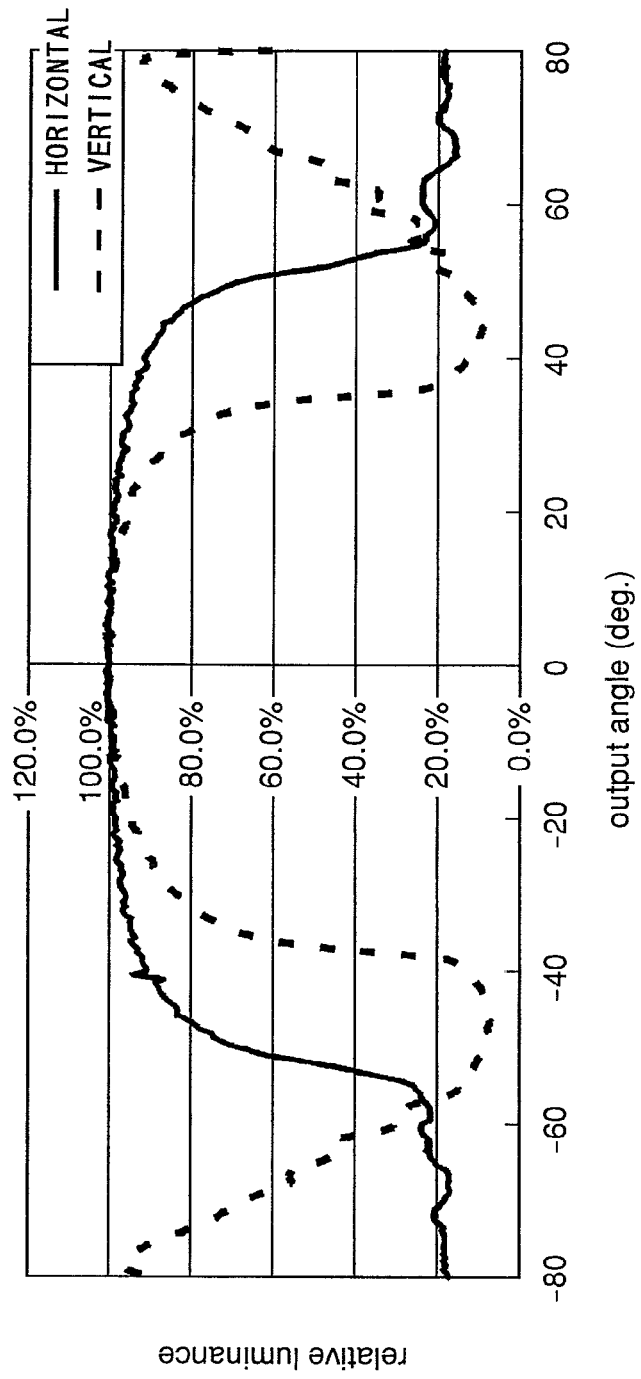
FIG. 12 is a diagram showing measurement results of the output angle properties of a light controlling sheet of a comparative example.

FIG. 12 is a diagram showing measurement results of the output angle properties of a light controlling sheet of a comparative example.

Comparing FIG. 11 and FIG. 12 with respect to the vertical direction, in the case of the comparative example, drastic degradation of luminance is seen around 40° of the output angle, and secondary luminance peaks are found in a greater output angle range of approximately 60° to 80°, in addition to a primary luminance peak around 0° of the output angle. In observation during display of the black color, significant leakage of light was found, as such deteriorating the contrast. On the other hand, in the case of the light controlling sheet 25 of this example, while the luminance around 0° of the output angle is slightly lowered, the foot or slope portions of the peak respectively spread more widely, as such the fall of the luminance is much gentler. In addition, unnecessary luminance peaks on the negative (upward) side of the output angle is substantially eliminated.

In the horizontal direction, there are no unnecessary luminance peaks, both in the cases of the comparative example and light controlling sheet 25. In the comparative example, however, drastic degradation of luminance is found around 60° of the output angle. On the other hand, the use of the light controlling sheet 25 can make the change of the luminance be significantly gentler or smoother.

In this manner, the use of the light controlling sheet 25 of this example can make the change of the viewing angle properties gentler, both in the horizontal and vertical directions. Additionally, in the vertical direction, it can suppress or substantially eliminate unnecessary luminance peaks.

Now, the reason for the above will be described. The drastic change of the luminance in the comparative example should be caused because the triangular prisms consisting only of flat faces are used. On the other hand, the curved unit optical structures well serve to make such drastic change be gentler and eliminate unnecessary peaks. However, in order to enhance the luminance around 0° of the output angle, it is more effective to use a flat face.

In the case of the display device as illustrated in this example, the viewing angle properties in the horizontal direction are required to be symmetrical, partly because human's eyes are arranged in the horizontal direction. In the vertical direction, however, it is not necessary that the viewing angle properties be symmetrical. The request for the viewing angle properties in the vertical direction, especially for those in the downward direction, is to narrow the viewing angle by utilizing steep change of the viewing angle properties, thereby to enhance the front luminance (in the direction of 0° of the output angle). This is because viewing the display from below is almost rare. On the other hand, for the properties in the upward direction, it is preferred to make the change due to the viewing angle gentler, and it is necessary to suppress unnecessary luminance peaks. Besides, for the properties in the horizontal direction, it is preferred to make the change of the viewing angle be wider and gentler as much as possible.

To address this challenge, in this example, it is intended to make the change of the luminance gentler and suppress unnecessary luminance peaks to be observed in the upward direction, while not lowering significantly the luminance around 0° of the output angle, by providing the asymmetric unit optical structures 251 each including the cylindrical face of the upper portion 251U and the flat face of the lower portion 251D.

In this way, when employing the light controlling sheet 25 of this example, since it includes the asymmetric unit optical structures each configured to combine the flat face portion and the curved face portion, the sheet can substantially eliminate unevenness of luminance and provide uniform illumination, irrespectively of positions for observing the screen. In particular, such a light controlling sheet 25 can suppress unnecessary luminance peaks, which tend to occur in greater output angular directions, and make the change of the luminance gentler or smoother.

Figure 13:
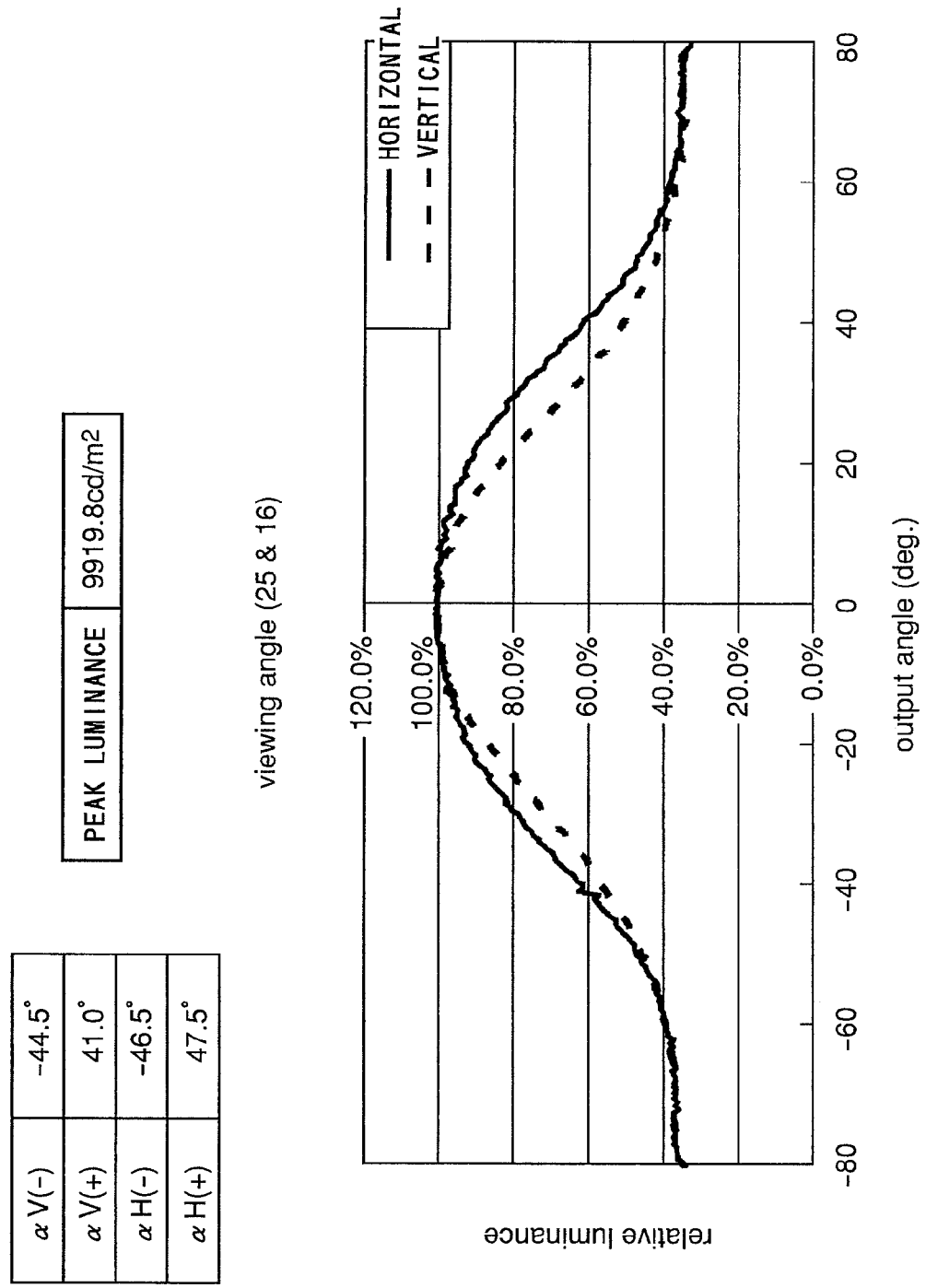
FIG. 13 is a diagram showing measurement results of the output angle properties in the case where the light diffusing sheet 16 is put on the output light side of the light controlling sheet 25.

FIG. 13 is a diagram showing measurement results of the output angle properties in the case where the light diffusing sheet 16 is put on the output light side of the light controlling sheet 25.

The measurements of the output angle properties were conducted, by using the viewing-angle-properties measuring device EZContrast, with the LCD panel 11 removed from the configuration shown in FIG. 1.

By putting the light diffusion sheet 16 on the output light side of the light controlling sheet 25, the half-maximum angle aV in the vertical direction was extended to a range of 44.5° to 41°, and the half-maximum angle aH in the horizontal direction became within a range of 46.5° to 47.5°. Some light condensing effect could be observed, and the peak luminance was enhanced from 8757.7 (cd/m$^2$) to 9919.8 (cd/m$^2$). In addition, the luminance rising portions having been observed in the range of 60° or greater were eliminated, providing a gentler slope of the output angle properties. It should be noted that while the viewing angle properties in the vertical direction were wider than aimed, the peak luminance can be made sufficiently high due to utilization of the light having been present in the range of 60° or greater.

According to this embodiment, a surface light source device can be provided, which can enhance the peak luminance as well as can exhibit significantly gentler and smoother output light properties, by putting the light diffusing sheet 16 on the light controlling sheet 25 including the asymmetric unit optical structures 251. In addition, due to the diffusing effect of the light diffusing sheet 16, occurrence of moiré can also be suppressed.

(Modifications)

The present invention is not limited to the examples described above, and various modifications and alterations may be made and should be considered to be equivalent to the scope of this invention.

(1) While, in each of the Examples, one example, in which each light controlling sheet 15, 25 has one kind of unit optical structures arranged on the output light side, has been described, this invention is not limited to this aspect. For instance, many kinds of unit optical structures may be combined and arranged on the output light side.

(2) While, in the Example 2, one example, in which the apex T of each unit optical structure 251 is of a pointed shape simply connecting the upper portion 251U with the lower portion 251D, has been described, this invention is not limited to this aspect. For example, as shown by a chain double-dashed line in FIG. 10, the apex T' may include a curved face smoothly connecting the upper portion 251U and the lower portion 251D, which are formed asymmetrically across the apex. Consequently, the change of the luminance can be smoother, and damage given to the light diffusing sheet 16 to be put on the light controlling sheet 25 can be prevented.

(3) While, in each of the Examples described above, one example, in which the light emitting portion includes a plurality of linear light sources, has been described, this invention is not limited to this aspect. For instance, the light emitting portion may be composed of point light sources, such as LED, arranged in large numbers, or may be a light emitting portion for performing surface luminescence, such as organic EL (electroluminescence) or inorganic EL.

The invention claimed is:

1. A surface light source device for illuminating a transmission device portion from the back side, comprising:
    a light source portion having an output light face for outputting substantially perfectly diffused light, a light emitting portion for emitting light, and a perfect diffusing sheet, which is adapted to provide substantially perfect diffusion of light emitted from the light emitting portion and constitutes the output light face, wherein a total light transmitivity of the perfect diffusing sheet is within a range of 50% to 70%;
    a light controlling sheet provided on the output light side relative to the light source portion and including unit optical structures each adapted to condense and/or diffuse light outputted from the light source portion; and
    a light diffusing sheet provided on the output light side relative to the light controlling sheet and including micro-convex structures formed on the output light side, the light diffusing sheet including a base layer and a light diffusing layer provided on the base layer, the light diffusing layer including multiple micro-beads and a binder for binding the micro-beads, wherein portions in which the micro-beads are bound project toward the output light side relative to the portions in which the micro-beads are not fixed and only the binder is included, thereby forming the micro-convex structures, and wherein a haze value of the light diffusing sheet is 70% or higher;
    wherein when aV is a half-maximum angle of light to be outputted from the light controlling sheet when the perfectly diffused light enters the light controlling sheet and is a vertical half-maximum angle that is a half-maximum angle as measured in the upward and downward directions in a normally used state of the surface light source device, and when aH is a half-maximum angle of light to be outputted from the light controlling sheet when the perfectly diffused light enters the light controlling sheet and as a horizontal half-maximum angle that is a half-maximum angle as measured in the leftward and rightward directions in a normally used state of the surface light source device, a relationship of 90°<aV+aH<115° is satisfied.

2. The surface light source device according to claim 1, wherein the following are satisfied:

35°<aV<45°, and

55°<aV<70°.

3. The surface light source device according to claim 1, wherein
    the unit optical structures formed on the light controlling sheet are of an asymmetrical shape in its cross section, and project toward the output light side, while being arranged in large numbers in a one-dimensional direction.

4. The surface light source device according to claim 3, wherein
    each unit optical structure formed on the light controlling sheet includes a flat face side portion formed of a flat face and a curved face side portion formed of a curved face.

5. The surface light source device according to claim 4, wherein
    the curved face side portion of each unit optical structure formed on the light controlling sheet is positioned on the upper side upon use, while the flat face side portion is positioned on the lower side upon use.

6. The surface light source device according to claim 3, wherein
    an apex of each unit optical structure formed on the light controlling sheet includes a curved face smoothly connecting the asymmetrically formed respective faces together across the apex.

7. The surface light source device according to claim 1, wherein
    the unit optical structure formed on the light controlling sheet projects toward the output light side and are arranged in large numbers in two-dimensional directions.

8. The surface light source device according to claim 1, wherein
    the unit optical structure formed on the light controlling sheet includes, in part, a shape formed as a substantially elliptical cylinder and/or includes, in part, a shape formed as a substantially spheroidal body, and is arranged in large numbers, projecting toward the output light side.

9. The surface light source device according to claim 1, wherein
the light controlling sheet is formed from one kind of thermoplastic resin.

10. A transmission display device, comprising:
a transmission display portion; and
a surface light source device, wherein the surface light source device is adapted for illuminating the transmission display portion from the back side, the surface light source device comprising
   a light source portion having an output light face for outputting substantially perfectly diffused light, a light emitting portion for emitting light, and a perfect diffusing sheet, which is adapted to provide substantially perfect diffusion of light emitted from the light emitting portion and constitutes the output light face, wherein the total light transmitivity of the perfect diffusing sheet is within a range of 50% to 70%;
   a light controlling sheet provided on the output light side relative to the light source portion and including unit optical structures each adapted to condense and/or diffuse light to be outputted from the light source portion; and
   a light diffusing sheet provided on the output light side relative to the light controlling sheet and including micro-convex structures formed on the output light side, the light diffusing sheet including a base layer and a light diffusing layer provided on the base layer, the light diffusing layer including multiple micro-beads and a binder for binding the micro-beads, wherein portions in which the micro-beads are bound project toward the output light side relative to the portions in which the micro-beads are not fixed and only the binder is included, thereby forming the micro-convex structures, and wherein a haze value of the light diffusing sheet is 70% or higher;
wherein when aV is a half-maximum angle of light to be outputted from the light controlling sheet when the perfectly diffused light enters the light controlling sheet and is a vertical half-maximum angle that is a half-maximum angle as measured in the upward and downward directions in a normally used state of the surface light source device, and when aH is a half-maximum angle of light to be outputted from the light controlling sheet when the perfectly diffused light enters the light controlling sheet and as a horizontal half-maximum angle that is a half-maximum angle as measured in the leftward and rightward directions in a normally used state of the surface light source device, a relationship of 90°<aV+aH<115° is satisfied.

* * * * *